United States Patent
Lindberg et al.

(10) Patent No.: US 11,340,002 B2
(45) Date of Patent: May 24, 2022

(54) EXPANSION DEVICE CONTROL SYSTEM FOR HEATING, VENTILATION, AND AIR CONDITIONING (HVAC) UNIT

(71) Applicant: Johnson Controls Technology Company, Auburn Hills, MI (US)

(72) Inventors: Gail Elaine Lindberg, Spring Grove, PA (US); Curtis Christian Crane, York, PA (US); Carlos Jose Uribe, Baltimore, MD (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/768,830

(22) PCT Filed: Dec. 4, 2018

(86) PCT No.: PCT/US2018/063878
§ 371 (c)(1),
(2) Date: Jun. 1, 2020

(87) PCT Pub. No.: WO2019/113094
PCT Pub. Date: Jun. 13, 2019

(65) Prior Publication Data
US 2021/0010732 A1 Jan. 14, 2021

Related U.S. Application Data

(60) Provisional application No. 62/595,351, filed on Dec. 6, 2017.

(51) Int. Cl.
*F25B 49/02* (2006.01)
*F25B 41/31* (2021.01)
*F25B 41/34* (2021.01)

(52) U.S. Cl.
CPC .............. *F25B 49/02* (2013.01); *F25B 41/31* (2021.01); *F25B 41/34* (2021.01);
(Continued)

(58) Field of Classification Search
CPC .......... F25B 41/31; F25B 41/34; F25B 49/02; F25B 2600/2513; F25B 2700/1933;
(Continued)

(56) References Cited

U.S. PATENT DOCUMENTS

2007/0151269 A1* 7/2007 Crane ..................... F25B 41/20
62/216
2009/0241570 A1* 10/2009 Kuribayashi ......... F25B 49/005
62/225

FOREIGN PATENT DOCUMENTS

| CN | 1645017 A | 7/2005 |
| CN | 101749805 A | 6/2010 |

(Continued)

OTHER PUBLICATIONS

International Search Report and Written Opinion for PCT Application No. PCT/US2018/063878, dated Jun. 3, 2019, 14 pgs.
(Continued)

*Primary Examiner* — Jonathan Bradford
(74) *Attorney, Agent, or Firm* — Fletcher Yoder, P.C.

(57) ABSTRACT

A heating, ventilating, and air conditioning (HVAC) system that includes a vapor compression system having a refrigerant, a compressor of the vapor compression system configured to circulate the refrigerant through the vapor compression system, an expansion device of the vapor compression system configured to adjust a flow of the refrigerant through the vapor compression system, and a controller configured to adjust a position of the expansion device based on a measured amount of superheat of the refrigerant entering the compressor, a measured discharge
(Continued)

temperature of the refrigerant leaving the compressor, or a combination thereof, such that the measured amount of superheat of the refrigerant entering the compressor reaches a target amount of superheat, the measured discharge temperature of the refrigerant leaving the compressor reaches a target discharge temperature, or a combination thereof.

11 Claims, 4 Drawing Sheets

(52) U.S. Cl.
CPC ............. *F25B 2600/2513* (2013.01); *F25B 2700/1933* (2013.01); *F25B 2700/21151* (2013.01); *F25B 2700/21152* (2013.01); *F25B 2700/21156* (2013.01)

(58) Field of Classification Search
CPC .. F25B 2700/21151; F25B 2700/21152; F25B 2700/21156
See application file for complete search history.

(56) References Cited

FOREIGN PATENT DOCUMENTS

| | | |
|---|---|---|
| CN | 102242996 A | 11/2011 |
| CN | 104534760 A | 4/2015 |
| CN | 104634033 A | 5/2015 |
| CN | 105115200 A | 12/2015 |
| EP | 3130870 A1 | 2/2017 |
| JP | 2001147048 A | 5/2001 |

OTHER PUBLICATIONS

European Office Action for EP Application No. 18822217.8, dated Apr. 6, 2021, 6 pgs.
Chinese Office Action for CN Application No. 201880085248.9, dated May 7, 2021, 9 pgs.
Taiwan Office Action and Search Report for TW Application No. 107143672, dated Apr. 13, 2022, 13 pgs.

\* cited by examiner

EXPANSION DEVICE CONTROL SYSTEM FOR HEATING, VENTILATION, AND AIR CONDITIONING (HVAC) UNIT

CROSS-REFERENCE TO RELATED APPLICATIONS

This application is a U.S. National Stage Application of PCT International Application No. PCT/US2018/063878, entitled "CONTROL SYSTEM FOR HVAC UNIT," filed Dec. 4, 2018, which claims priority from and the benefit of U.S. Provisional Application Ser. No. 62/595,351, entitled "CONTROL SYSTEM FOR HVAC UNIT," filed Dec. 6, 2017, which are hereby incorporated by reference in their entireties for all purposes.

BACKGROUND

The present disclosure relates generally to heating, ventilating, and air conditioning systems. Specifically, the present disclosure relates to systems and methods for controlling an electronic expansion valve (EEV) in a vapor compression system.

A wide range of applications exists for heating, ventilating, and air conditioning (HVAC) systems. For example, residential, commercial, and industrial systems are used to control temperatures and air in residences and buildings using a fluid, such as a refrigerant. The HVAC systems may circulate the refrigerant through a closed loop between an evaporator where the refrigerant absorbs heat and a condenser where the refrigerant releases heat. As an example, the refrigerant may absorb heat from a first fluid and transfer the heat to a second fluid to ultimately cool the first fluid and/or heat the second fluid. The refrigerant evaporates into a vapor when flowing through the evaporator by absorbing the heat from the first fluid. The compressor then compresses the vapor to cause the pressure and/or temperature of the vapor to rise for subsequent cooling by the second fluid in the condenser, thereby transferring heat from the first fluid to the second fluid.

In some cases, the vapor is superheated at the inlet of the compressor to ensure that the refrigerant is in a vapor state before entering the compressor. To control an amount of superheat of the refrigerant entering the compressor, existing systems include a liquid injection device that cools the vapor within the compressor. For example, the liquid injection device injects liquid refrigerant droplets into the compressor, or at an inlet of the compressor, to adjust an amount of superheat of the vapor entering the compressor and/or a temperature of the vapor exiting the compressor. Unfortunately, liquid injection devices include additional components (e.g., tubing, pumps, nozzles, among others) to inject the liquid refrigerant into the compressor. Additionally, injecting liquid refrigerant into the compressor may reduce a performance of the compressor, and thus, reduce a performance of the HVAC system.

SUMMARY

In one embodiment, a heating, ventilating, and air conditioning (HVAC) system includes a vapor compression system having a refrigerant, a compressor of the vapor compression system configured to circulate the refrigerant through the vapor compression system, an expansion device of the vapor compression system configured to adjust a flow of the refrigerant through the vapor compression system, and a controller configured to adjust a position of the expansion device based on a measured amount of superheat of the refrigerant entering the compressor, a measured discharge temperature of the refrigerant leaving the compressor, or a combination thereof, such that the measured amount of superheat of the refrigerant entering the compressor reaches a target amount of superheat, the measured discharge temperature of the refrigerant leaving the compressor reaches a target discharge temperature, or a combination thereof.

In another embodiment, one or more tangible, non-transitory machine-readable media includes processor-executable instructions to receive first feedback indicative of a temperature and a pressure of refrigerant entering a compressor of a vapor compression system, determine a measured amount of superheat of the refrigerant entering the compressor of the vapor compression system using the temperature and the pressure of the refrigerant entering the compressor of the vapor compression system, receive second feedback indicative of a discharge temperature of the refrigerant leaving the compressor of the vapor compression system, and adjust a position of an expansion device of the vapor compression system based on the measured amount of superheat of the refrigerant entering the compressor, the discharge temperature of the refrigerant leaving the compressor, or a combination thereof, such that the refrigerant entering the compressor reaches a target amount of superheat, the refrigerant leaving the compressor reaches a target discharge temperature, or a combination thereof.

In an another embodiment, a method includes receiving first feedback indicative of a temperature and a pressure of refrigerant entering a compressor of a vapor compression system, determining a measured amount of superheat of the refrigerant entering the compressor of the vapor compression system using the temperature and the pressure of the refrigerant entering the compressor of the vapor compression system, receiving second feedback indicative of a discharge temperature of the refrigerant leaving the compressor of the vapor compression system, and adjusting a position of an expansion device of the vapor compression system based on the measured amount of superheat of the refrigerant entering the compressor, the discharge temperature of the refrigerant leaving the compressor, or a combination thereof, such that the refrigerant entering the compressor reaches a target amount of superheat, the refrigerant leaving the compressor reaches a target discharge temperature, or a combination thereof.

DRAWINGS

DETAILED DESCRIPTION

Embodiments of the present disclosure are directed to a heating, ventilating, and air conditioning (HVAC) system that adjusts a position of an expansion device (e.g., electronic expansion valve (EEV)) to control an amount of superheat of a refrigerant entering a compressor (e.g., suction superheat) and/or a temperature of refrigerant discharged from the compressor (e.g., discharge temperature). In accordance with embodiments of the present disclosure, the HVAC system includes one or more control devices that are configured to adjust a position of the expansion device to control suction superheat and/or discharge temperature. As discussed above, existing HVAC systems utilize a liquid injection device that injects liquid refrigerant droplets into the compressor. Unfortunately, the liquid injection device utilizes additional components that increase a cost of the HVAC system. Further, liquid injection devices reduce a performance of the compressor as a result of the liquid refrigerant droplets contacting moving components of the compressor.

Accordingly, modulating the expansion device to control suction superheat and/or discharge temperature of the compressor may eliminate a liquid injection device from the HVAC system and improve performance of the compressor. In some embodiments, the expansion device is controlled using a first control module (e.g., a suction superheat module) under a first set of operating parameters of the HVAC system, and the expansion device is controlled using a second control module (e.g., a discharge temperature module) under a second set of operating parameters of the HVAC system. For example, the first control module may be utilized during startup conditions (e.g., for a predetermined amount of time upon initiating operation of the compressor) and/or when an amount of superheat of refrigerant (e.g., determined from a pressure and temperature of the refrigerant) entering the compressor exceeds a first threshold. Additionally, the second control module may be utilized when a temperature of refrigerant discharged from the compressor exceeds a second threshold. In certain embodiments, the HVAC system includes a first controller (e.g., a first proportional, integral, derivative (PID) controller) that includes the first control module and a second controller (e.g., a second PID controller) that includes the second control module. In other embodiments, the HVAC system includes a single controller (e.g., a PID controller) that includes both the first control module and the second control module. In any case, the expansion device is adjusted based on an amount of superheat of refrigerant flowing into the compressor (e.g., suction superheat) and a temperature of refrigerant discharged from the compressor (e.g., discharge temperature). As such, a temperature of the refrigerant is controlled without injecting liquid droplets into the compressor, thereby increasing an efficiency of the compressor and/or the HVAC system.

Figure 1:
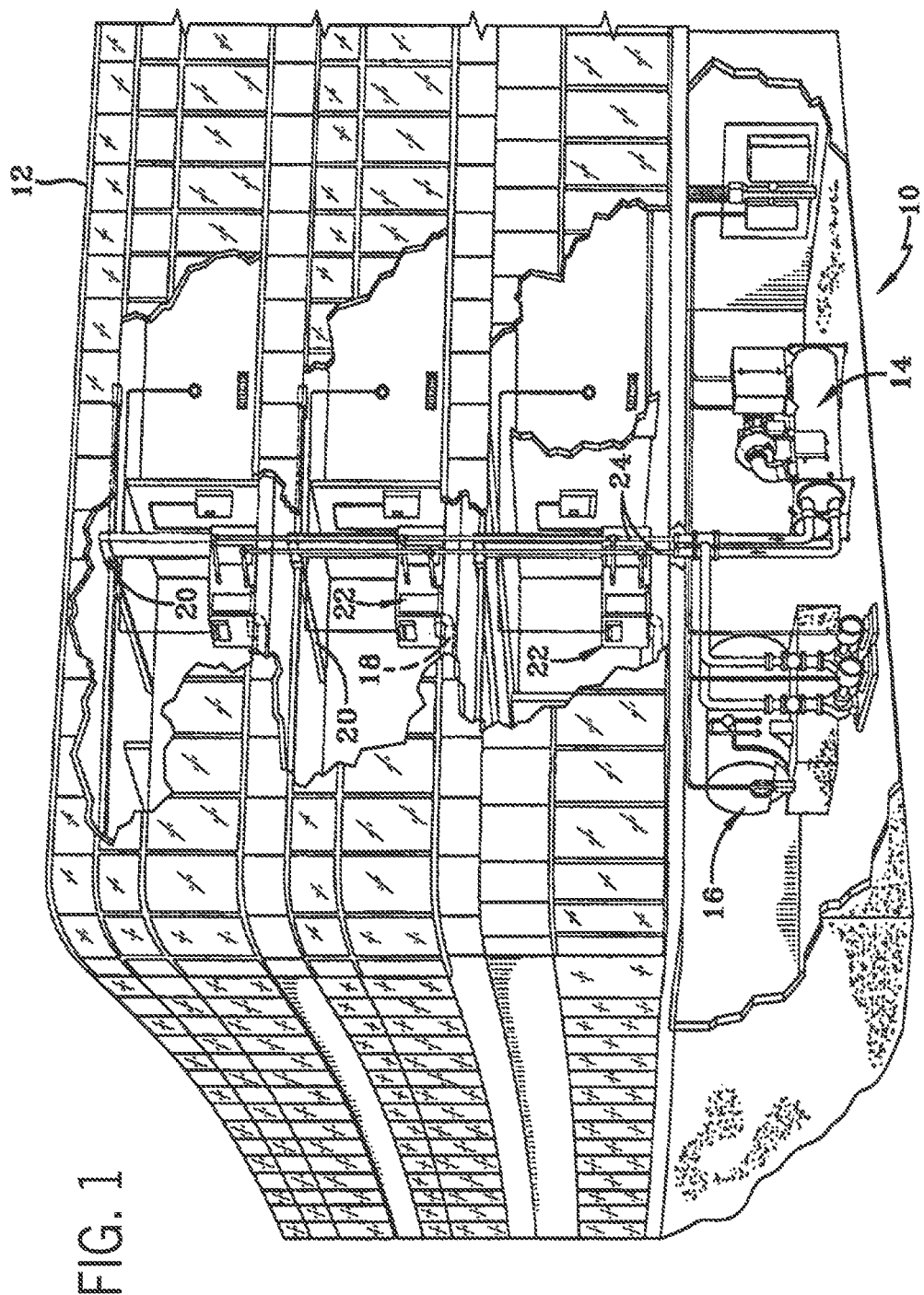
FIG. 1 is a schematic of an environmental control for building environmental management that may employ one or more HVAC units, in accordance with an aspect of the present disclosure.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
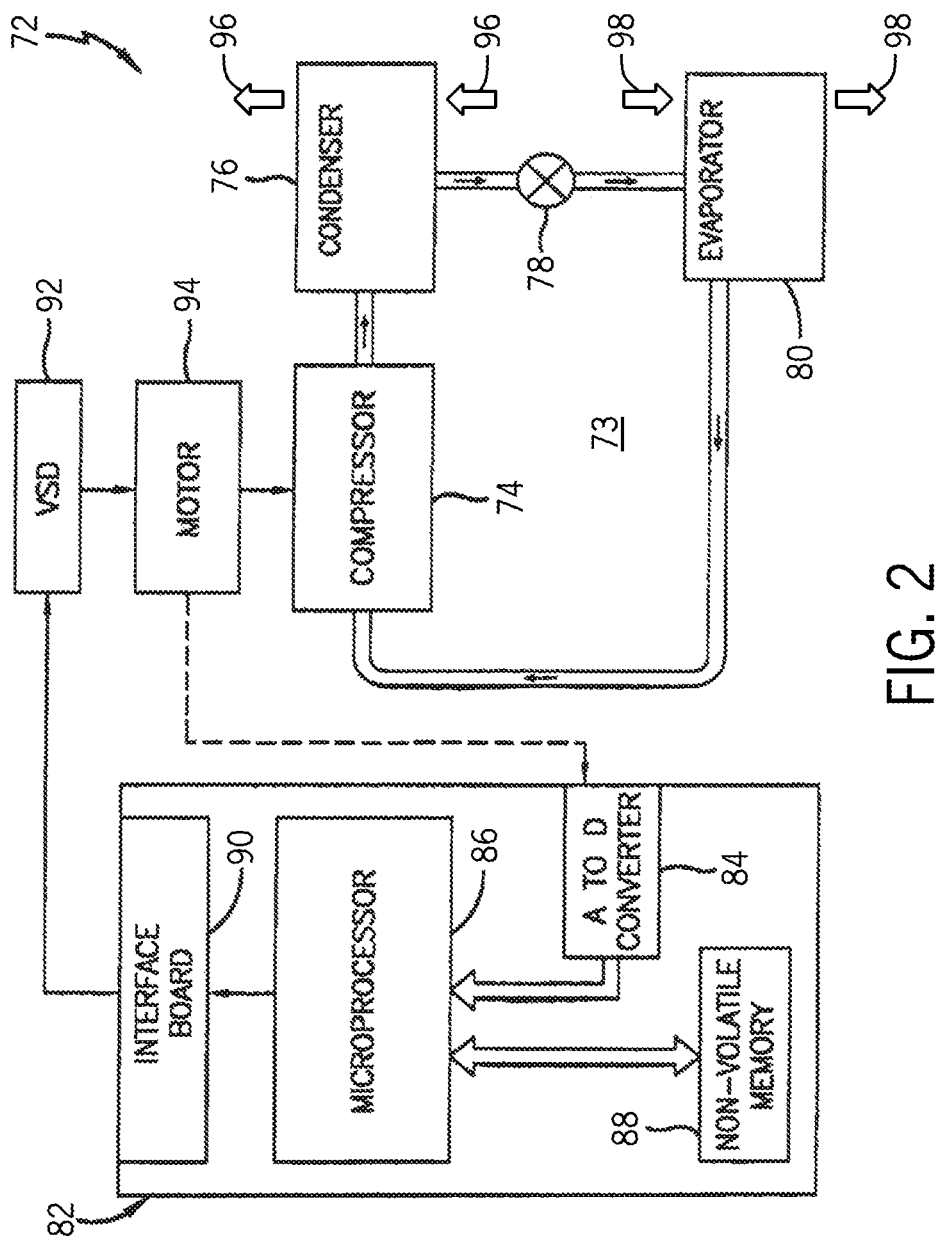
FIG. 2 is a schematic of a vapor compression system that may be utilized in the HVAC unit of FIG. 1, in accordance with an aspect of the present disclosure.

FIG. 2 is an embodiment of a vapor compression system 72 that can be used in the HVAC unit 12 described above. The vapor compression system 72 may circulate a refrigerant through a refrigerant loop 73 starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, in some embodiments, the expansion device 78 is an electronic expansion valve (EEV) that may be adjusted to control a temperature of refrigerant entering and/or exiting the compressor 74. Existing systems utilize a liquid injection system to control a temperature of the refrigerant in the compressor 74. Unfortunately, liquid injections systems may reduce an efficiency of the compressor 74 and/or the HVAC unit 12. Accordingly, embodiments of the present disclosure are directed to control of the expansion device 78 using a first control module (e.g., a suction superheat module) under a first set of operating parameters of the HVAC system and a second control module (e.g., a discharge temperature module) under a second set of operating parameters of the HVAC system. For example, the first control module may be utilized during startup conditions (e.g., for a predetermined amount of time upon initiating operation of the compressor 74) and/or when a temperature of refrigerant entering the compressor 74 exceeds a first threshold. Additionally, the second control module may be utilized when a temperature of refrigerant discharged from the compressor 74 exceeds a second threshold.

Figure 3:
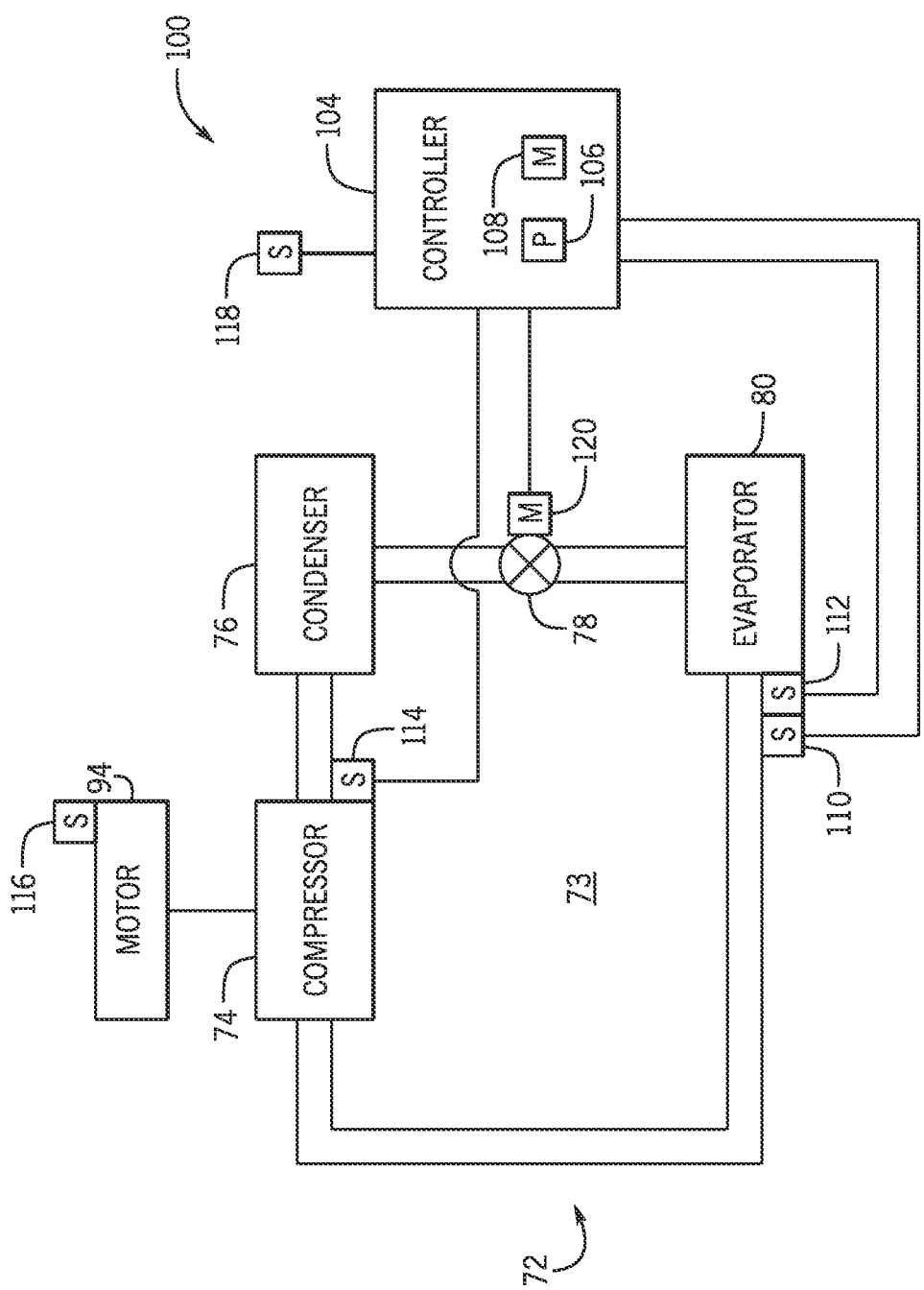
FIG. 3 is a schematic of the vapor compression system of FIG. 2, in accordance with an aspect of the present disclosure.

FIG. 3 illustrates control circuitry 100 that may be used to control operation of the expansion device 78 in the vapor compression system 72 described in FIG. 2. A position of the expansion device 78 may be adjusted based on an amount of superheat of refrigerant entering the compressor 74 (e.g., a suction port of the compressor 74) and/or a temperature of refrigerant exiting the compressor 74 (e.g., a discharge port of the compressor 74). That is, the control circuitry 100 may adjust a position of the expansion device 78 to obtain a flow of refrigerant that causes an amount of superheat of the refrigerant at the outlet of the evaporator 80 and/or the inlet of the compressor 74 to reach a target superheat. Additionally, the control circuitry 100 may adjust a position of the expansion device 78 to reach a flow rate of refrigerant that causes a temperature of the refrigerant discharged from the compressor 74 to reach a target discharge temperature. The control circuitry 100 may include a controller 104, such as a microcontroller. The controller 104 may include a processor 106 operatively coupled to memory 108 to execute software, such as software for controlling a position of the expansion device 78. Moreover, the processor 106 may include multiple processors, one or more "general-purpose" microprocessors, one or more special-purpose microprocessors, and/or one or more application specific integrated circuits (ASICS), or some combination thereof. For example, the processor 106 may include one or more reduced instruction set (RISC) processor, advanced RISC machine (ARM) processor, performance optimization with enhanced RISC (PowerPC) processor, field-programmable gate array (FPGA) integrated circuit, graphics processing unit (GPU), or any other suitable processing device.

The memory 108 may include a volatile memory, such as random access memory (RAM), nonvolatile memory, such as read-only memory (ROM), flash memory, or any combination thereof. The memory 108 may store a variety of information that may be used for various purposes. For example, the memory 108 may store processor-executable instructions (e.g., firmware or software) for the processors 106 to execute, such as instructions for controlling the expansion device 78.

The processor 106 may execute instructions to receive one or more signals from one or more sensors of the vapor compression system 72. For example, the control circuitry 100 (e.g., control system) may include sensors 110, 112, 114, 116, and/or 118 positioned on or about various components of the vapor compression system 72. For instance, the control circuitry 100 may include a temperature sensor 110 and a pressure sensor 112 positioned on an outlet of the evaporator 80. The temperature sensor 110 may send a signal to the controller 104 indicating a temperature of the refrigerant as the refrigerant leaves the evaporator 80. Similarly, the pressure sensor 112 may send a signal to the controller 104 indicating a pressure of the refrigerant leaving the evaporator 80. The processor 106 may receive each of the respective signals from the temperature sensor 110 and the pressure sensor 112 and determine a superheat of the refrigerant as the refrigerant exits the evaporator 80 (and/or enters the compressor 74), which indicates the amount of heat in the refrigerant with respect to a saturation point of the refrigerant. For instance, the processor 106 may determine the superheat by utilizing a lookup table stored in the memory 108 that defines a relationship of the superheat with respect to the temperature and the pressure of the refrigerant at the outlet of the evaporator 80 (and/or at the inlet of the compressor 74). The lookup table may be based on physical properties (e.g., saturation point, quantity, etc.) of the refrigerant.

Additionally, the control circuitry 100 may include a temperature sensor 114 (e.g., a second temperature sensor) that monitors a temperature of the refrigerant discharged from the compressor 74. As such, the processor 106 may determine a discharge temperature of the refrigerant from the compressor 74 and compare the discharge temperature to a threshold temperature, a predetermined temperature range, or a combination thereof. Additionally or alternatively, the control circuitry 100 may include a temperature sensor 116 (e.g., a third temperature sensor) that monitors a temperature of the motor 94 that is configured to drive the compressor 74. As such, the processor 106 may determine a motor temperature and compare the motor temperature to a threshold motor temperature, a predetermined motor temperature range, or a combination thereof. In some embodiments, an ambient temperature sensor 118 may be positioned proximate to the vapor compression system 72 to detect temperature of the surrounding air. While the sensors 110, 112, 114, 116, and/or 118 are described in detail, any suitable sensors that detect operating conditions of the vapor compression system 72 may be used.

The processor 106 may receive one or more signals indicating operating conditions (e.g., temperature, pressure, vibrations, etc.) of the vapor compression system 72. The processor 106 may then be configured to initiate and/or utilize control modules of the processor 106 based on the one or more signals indicative of operating conditions of the vapor compression system 72. For example, the processor 106 may compare a predetermined amount of superheat (e.g., target superheat or setpoint superheat) of the refrigerant leaving the evaporator 80 (and/or entering the compressor 74) with a measured amount of superheat of the refrigerant leaving the evaporator 80 (and/or entering the compressor 74). Additionally, the processor 106 may compare a predetermined discharge temperature (e.g., target discharge temperature or setpoint discharge temperature) of the refrigerant exiting the compressor 74 with a measured discharge temperature of the refrigerant exiting the compressor 74. The processor 106 may then determine a suitable control module to utilize and/or activate based on the comparisons performed by the processor 106.

When the processor 106 operates under a first control module (e.g., suction superheat control), the processor 106 adjusts the expansion device 78 based on a difference between the target superheat and the measured superheat of the refrigerant leaving the evaporator 80 and/or entering the compressor 74. For example, if the target superheat is 10 degrees Fahrenheit (° F.) above the saturation point of the refrigerant and the measured superheat (e.g., based on a temperature and a pressure of the refrigerant exiting the evaporator 80 and/or entering the compressor 74) is 5° F. above the saturation point, the processor 106 may send a signal to an actuator 120 (e.g., a motor or a stepper motor) of the expansion device 78 to adjust a position of the expansion device 78. As such, the position of the expansion device 78 may be adjusted to reduce a flow rate of refrigerant directed to the evaporator 80, thereby increasing an amount of superheat of the refrigerant, to ultimately achieve the target superheat of 10° F.

Additionally, when the processor 106 operates under a second control module (e.g., discharge temperature control), the processor 106 adjusts the expansion device 78 based on a difference between the target discharge temperature and the measured discharge temperature of the refrigerant exiting the compressor 74. For example, when the target discharge temperature is 175° F. and the measured discharge temperature is 160° F., the processor 106 adjusts a position of the expansion device 78 via the actuator 120. As such, the position of the expansion device 78 is adjusted to reduce a flow rate of refrigerant through the compressor 74 and to increase a temperature of the refrigerant discharged from the compressor 74. Further, in some embodiments, the processor 106 may adjust the position of the expansion device 78 based on a temperature of the motor 94 driving the compressor 74 (e.g., measured by the sensor 116) in addition to, or in lieu of, adjusting the position of the expansion device 78 based on the discharge temperature of the refrigerant.

The controller 104 may include one or more proportional-integral-derivative (PID) controllers, fuzzy logic controllers, or any other suitable controllers 104 to perform the control modules that adjust the expansion device 78 to achieve the target superheat, the target discharge temperature, and/or a target motor temperature. The controller 104 switches between various control modules (e.g., a suction superheat control module, a discharge temperature control module, and/or a motor temperature control module) based on measured operating parameters from the one or more sensors 110, 112, 114, 116, and/or 118.

Figure 4:
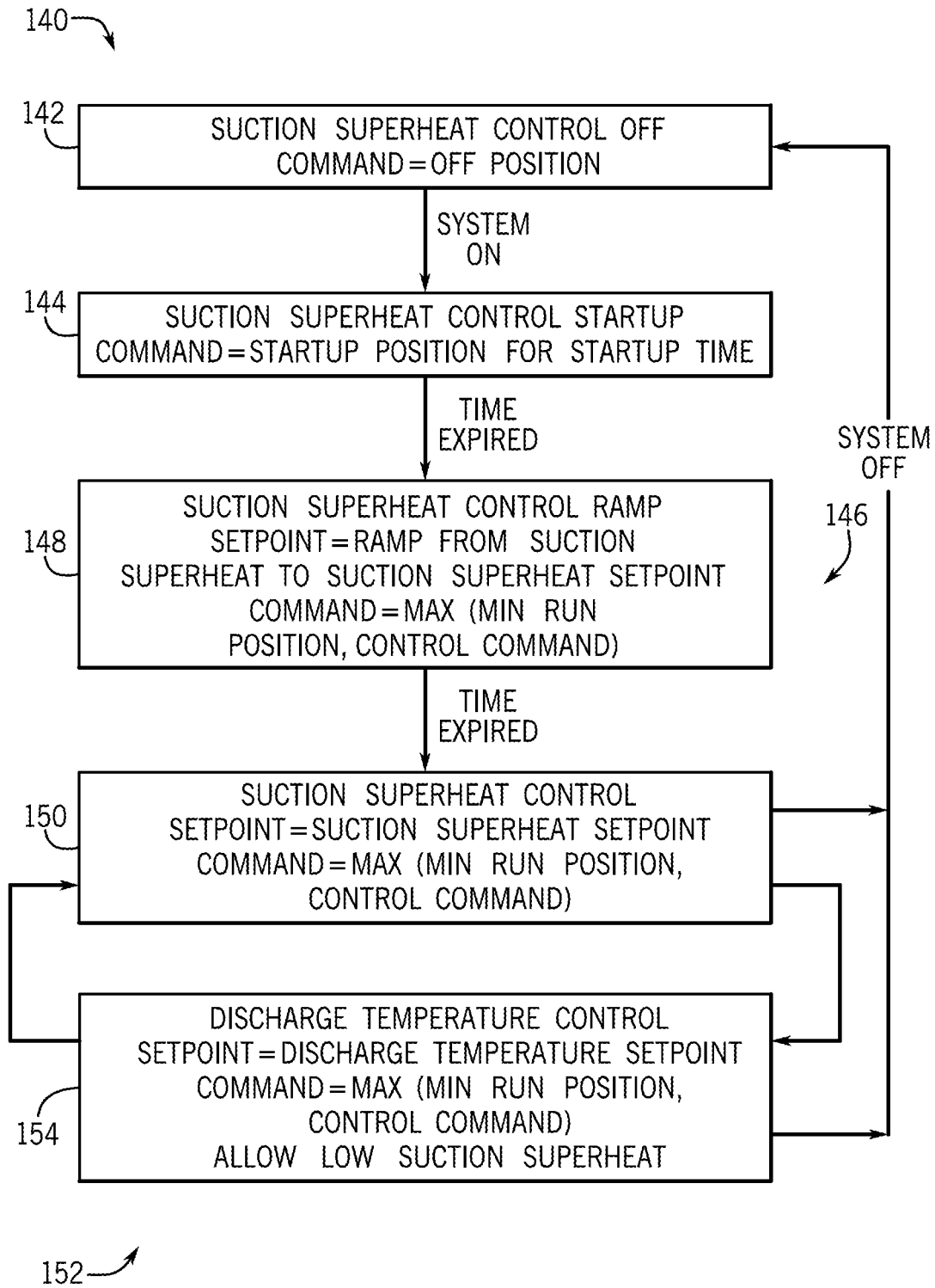
FIG. 4 is a block diagram of a process that may be utilized to adjust an electronic expansion valve of the vapor compression system of FIGS. 2 and 3, in accordance with an aspect the present disclosure.

For example, FIG. 4 is a block diagram of a flow chart 140 that illustrates logic performed by the controller 104 to operate and switch between control modules. For example, at block 142, the compressor 74 is inactive (e.g., powered off or not operating). As such, the vapor compression system 72 may not circulate refrigerant. Thus, the expansion device 78 is not adjusted to control a flow rate of refrigerant to the evaporator 80 because refrigerant is not circulated through the vapor compression system 72 via the compressor 74.

At block 144, a startup sequence of the compressor 74 may be initiated, and the controller 104 operates under a first control module 146 (e.g., suction superheat control). For example, the first control module 146 may include the startup sequence, whereby the controller 104 sends a signal to the expansion device 78 adjusting a position of the expansion device 78 to a startup position for a predetermined amount of time (e.g., 1 second, 2 seconds, 3 seconds, 4 seconds, 5 seconds, or more than 5 seconds). For example, when the expansion device 78 is in the startup position, the expansion device 78 may enable a relatively high flow rate of refrigerant to circulate through the vapor compression system 72 so that the vapor compression system 72 may quickly reach steady-state operation.

Once the predetermined amount of time for the startup position of the expansion device 78 has lapsed, the controller 104 may undergo a suction superheat control ramp of the first control module 146, at block 148. For example, once the vapor compression system 72 reaches substantially steady state operation, the controller 104 adjusts the expansion device 78 so that the superheat of refrigerant leaving the evaporator 80 and entering the compressor 74 (e.g., a suction port of the compressor 74) reaches a target superheat. As such, the controller 104 sends a second signal to the expansion device 78 to adjust a position of the expansion device 78 based on feedback received from the sensors 110, 112, 114, 116, and/or 118. In some embodiments, the controller 104 is configured to adjust the expansion device 78 to either a threshold position (e.g., a predetermined position that circulates a minimum amount of refrigerant through the vapor compression system 72) or a command position that is based on the target superheat. For example, the command position is determined by the controller 104 as a position of the expansion device 78 that enables the superheat of refrigerant leaving the evaporator 80 and entering the compressor 74 to reach the target superheat. The controller 104 compares the threshold position to the command position and selects the position that corresponds to a higher flow rate of refrigerant through the vapor compression system 72. In other words, the controller 104 may correlate a position of the expansion device 78 with a value that is proportional to the flow rate of refrigerant through the vapor compression system 72. As such, the controller 104 selects the position (e.g., the threshold position or the command position) that includes the higher value so that refrigerant is not blocked from circulating through the vapor compression system 72.

Additionally, once the measured superheat of the refrigerant reaches the target superheat, the controller 104 may operate under suction superheat control of the first control module 146, at block 150. In some embodiments, suction superheat control may be similar to the suction superheat control ramp, as shown in block 148, with smaller adjustments to the position of the expansion device 78 (e.g., suction superheat control ramp may make relatively large adjustments to the position of the expansion device 78 to reach the target superheat quickly). In other words, suction superheat control at block 150 is utilized to maintain the measured superheat of refrigerant leaving the evaporator 80 and entering the compressor 74 at the target superheat. Thus, relatively minor adjustments to the expansion device 78 are made during the suction superheat control at block 150.

During suction superheat control at block 150, the controller 104 sends a third signal to the expansion device 78 to adjust a position of the expansion device 78 based on feedback received from the sensors 110, 112, 114, 116, and/or 118. The controller 104 is configured to adjust the expansion device 78 to either a threshold position (e.g., a predetermined position that circulates a minimum amount of refrigerant through the vapor compression system 72) or a command position that is based on the target superheat. In some embodiments, the threshold position of the suction superheat control of block 150 is the same as the threshold position of the suction superheat control ramp of block 148. However, in other embodiments, the threshold position of the suction superheat control of block 150 is different from the threshold position of the suction superheat control ramp of block 148. In any case, the command position is determined by the controller 104 as a position of the expansion device 78 that enables the superheat of refrigerant leaving the evaporator 80 and entering the compressor 74 to reach the target superheat. The controller 104 compares the threshold position to the command position and selects the position that corresponds to a higher flow rate of refrigerant through the vapor compression system 72 (or a higher value corresponding to flow rate of refrigerant through the vapor compression system 72) so that refrigerant is not blocked from circulating through the vapor compression system 72.

As discussed above, the controller 104 is configured to switch between the first control module 146 and a second control module 152 based on operating parameters of the vapor compression system 72 monitored by the sensors 110, 112, 114, 116, and/or 118. For example, the controller 104 may be configured to switch from the first control module 146 (e.g., suction superheat control) to the second control module 152 (e.g., discharge temperature control) based at least on the discharge temperature of the refrigerant leaving the compressor 74 (e.g., as measured by sensor 114). The controller 104 may compare a measured discharge temperature from the sensor 114 to one or more discharge temperature thresholds stored in the memory 108 of the controller 104. In some embodiments, the controller 104 switches from the first control module 146 to the second control module 152 when the measured discharge temperature exceeds a first discharge temperature threshold for a predetermined amount of time (e.g., 1 second, 2 seconds, 3 seconds, 4 seconds, 5 seconds, or more than 5 seconds). Further, the controller may be configured to immediately switch from the first control module 146 to the second control module 152 when the measured discharge temperature exceeds a second discharge temperature threshold, where the second discharge temperature threshold is greater than the first discharge temperature threshold by an offset amount. In some embodiments, the offset amount between the first discharge temperature threshold and the second discharge temperature threshold is between 5° F. and 50° F., between 7° F. and 25° F., or between 8° F. and 15° F.

When the controller 104 operates under the second control module 152, the controller 104 adjusts a position of the expansion device 78 based on the measured discharge temperature to achieve the target discharge temperature, as shown in block 154. For example, when the measured discharge temperature falls below the target discharge temperature, the controller 104 sends a signal to adjust a position of the expansion device 78 to reduce a flow of the refrigerant through the vapor compression system 72 (e.g., reducing the flow of refrigerant through the evaporator 80 increases a temperature of the refrigerant discharged from the compressor 74). Similarly, when the measured discharge temperature exceeds the target discharge temperature, the controller 104 sends a signal to adjust the position of the expansion device 78 to increase a flow of the refrigeration through the vapor compression system 72 (e.g., increasing the flow of refrigerant through the evaporator 80 reduces a temperature of the refrigerant discharged from the compressor 74). As discussed above, in other embodiments, the second control module 152 may adjust the position of the expansion device 78 based on a temperature of the motor 94, in addition to or in lieu of, the discharge temperature of the refrigerant from the compressor 74.

As discussed above, the signal sent from the controller 104 may include a position of the expansion device 78 that is selected from a threshold position (e.g., e.g., a predetermined position that circulates a minimum amount of refrigerant through the vapor compression system 72) and a command position that is based on the measured discharge temperature. In some embodiments, the threshold position of the discharge temperature control at block 154 is the same or different as the threshold position of the suction superheat ramp control at block 148 and/or the suction superheat control at block 150. The command position is determined by the controller 104 as a position of the expansion device 78 that enables the discharge temperature of refrigerant leaving the compressor 74 to reach the target discharge temperature. The controller 104 compares the threshold position to the command position and selects the position that corresponds to a higher flow rate of refrigerant through the vapor compression system 72. In other words, the controller 104 may correlate a position of the expansion device 78 with a value that is proportional to the flow rate of refrigerant through the vapor compression system 72. As such, the controller 104 selects the position (e.g., the threshold position or the command position) that includes the higher value so that refrigerant is not blocked from circulating through the vapor compression system 72.

In some embodiments, the second control module 152 overrides the first control module 146 (e.g., the suction superheat override). For example, in some cases, adjusting the expansion device 78 to achieve the target discharge temperature causes the suction superheat to decrease below a predetermined amount. As such, the controller 104 overrides the first control module 146 despite the superheat of the refrigerant falling below the target superheat.

Additionally, the controller 104 receives feedback from the sensors 110 and 112 indicative of the temperature and pressure of the refrigerant leaving the evaporator 80 (and/or entering the compressor 74). As discussed above, the temperature and pressure of the refrigerant leaving the evaporator 80 (and/and entering the compressor 74) may be utilized to determine an amount of superheat of the refrigerant. The controller 104 may switch from the second control module 152 to the first control module 146 (e.g., from block 154 to block 150) when the measured amount of superheat (e.g., determined from the feedback from the sensors 110 and 112) exceeds a first superheat threshold for a predetermined amount of time (e.g., 1 second, 2 seconds, 3 seconds, 4 seconds, 5 seconds, or more than 5 seconds). Additionally, the controller 104 may immediately switch from the second control module 152 to the first control module 146 when the measured amount of superheat exceeds a second superheat threshold, where the second superheat threshold is greater than the first superheat threshold. The controller 104 may then operate under the first control module 146 and adjust the position of the expansion device 78 based on the measured amount of superheat of the refrigerant leaving the evaporator 80 (and/or entering the compressor 74).

As set forth above, embodiments of the present disclosure may provide one or more technical effects useful in the operation of HVAC systems to improve an efficiency of a compressor. For example, embodiments of the present disclosure are directed to controlling a position of an electronic expansion valve based on an amount of superheat of refrigerant leaving an evaporator and/or refrigerant entering the compressor as well as a discharge temperature of refrigerant leaving the compressor. Control of the electronic expansion valve enables operating temperatures of the refrigerant through the compressor to be adjusted without utilizing a liquid injection system that directs liquid refrigerant droplets into the compressor. Eliminating and/or reducing liquid droplets within the compressor enhances an efficiency of the compressor, and thus, improves operation of the HVAC system. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode, or those unrelated to enablement). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilating, and air conditioning (HVAC) system, comprising:
   a vapor compression system comprising a refrigerant;
   a compressor of the vapor compression system configured to circulate the refrigerant through the vapor compression system;
   an expansion device of the vapor compression system configured to adjust a flow of the refrigerant through the vapor compression system; and
   a controller configured to operate according to a first control module to adjust a position of the expansion device based on a measured amount of superheat of the refrigerant entering the compressor to achieve a target amount of superheat, and to operate according to a second control module to adjust the position of the expansion device based on a measured discharge temperature of the refrigerant leaving the compressor to achieve a target discharge temperature, wherein the controller is configured to switch from the first control module to the second control module in response to determining that the measured discharge temperature of the refrigerant leaving the compressor exceeds a first discharge temperature threshold for a predetermined amount of time and to switch from the first control module to the second control module in response to determining that the measured discharge temperature of the refrigerant leaving the compressor exceeds a second discharge temperature threshold, wherein the second discharge temperature threshold is greater than the first discharge temperature threshold.

2. The HVAC system of claim 1, wherein the controller is configured to switch from the second control module to the first control module in response to determining that the measured amount of superheat of the refrigerant entering the compressor exceeds a first superheat threshold for the predetermined amount of time or in response to determining that the measured amount of superheat of the refrigerant entering the compressor exceeds a second superheat threshold, wherein the second superheat threshold is greater than the first superheat threshold.

3. The HVAC system of claim 1, wherein the controller is configured to send a signal to adjust the position of the expansion device when operating according to the first control module, and wherein the signal comprises a threshold position of the expansion device or a command position of the expansion device based on the measured amount of superheat of the refrigerant entering the compressor, whichever enables a greater flow of refrigerant through the expansion device.

4. The HVAC system of claim 1, wherein the controller is configured to send a signal to adjust the position of the expansion device when operating according to the second control module, and wherein the signal comprises a threshold position of the expansion device or a command position of the expansion device based on the measured discharge temperature of the refrigerant leaving the compressor, whichever enables a greater flow of refrigerant through the expansion device.

5. The HVAC system of claim 1, wherein the controller is configured to operate according to the first control module during startup of the compressor.

6. The HVAC system of claim 1, wherein the expansion device is an electronic expansion valve.

7. The HVAC system of claim 1, comprising a motor configured to drive the compressor, wherein the controller is configured to adjust the position of the expansion device based on a measured motor temperature of the motor to achieve a target motor temperature.

8. One or more tangible, non-transitory machine-readable media comprising processor-executable instructions to:
   receive first feedback indicative of a temperature and a pressure of refrigerant entering a compressor of a vapor compression system;
   determine a measured amount of superheat of the refrigerant entering the compressor of the vapor compression system using the temperature and the pressure of the refrigerant entering the compressor of the vapor compression system;
   receive second feedback indicative of a discharge temperature of the refrigerant leaving the compressor of the vapor compression system; and
   adjust a position of an expansion device of the vapor compression system using a first control module or a second control module, wherein the first control module is configured to adjust the expansion device based on the measured amount of superheat of the refrigerant entering the compressor to achieve a target amount of superheat, and the second control module is configured to adjust the expansion device based on the discharge temperature of the refrigerant leaving the compressor to achieve a target discharge temperature;
   switch from using the first control module to using the second control module in response to determining that the discharge temperature of the refrigerant leaving the compressor exceeds a first discharge temperature threshold for a predetermined amount of time; and switch from using the first control module to using the second control module in response to determining that the discharge temperature of the refrigerant leaving the compressor exceeds a second discharge temperature threshold, wherein the second discharge temperature threshold is greater than the first discharge temperature threshold.

9. The one or more tangible, non-transitory machine-readable media of claim 8, wherein the processor-executable instructions are configured to switch from using the second control module to using the first control module in response to determining that the measured amount of superheat of the refrigerant entering the compressor exceeds a first superheat threshold for the predetermined amount of time or in response to determining that the measured amount of superheat of the refrigerant entering the compressor exceeds a second superheat threshold, wherein the second superheat threshold is greater than the first superheat threshold.

10. A method, comprising:
receiving first feedback indicative of a temperature and a pressure of refrigerant entering a compressor of a vapor compression system;
determining a measured amount of superheat of the refrigerant entering the compressor of the vapor compression system using the temperature and the pressure of the refrigerant entering the compressor of the vapor compression system;
receiving second feedback indicative of a discharge temperature of the refrigerant leaving the compressor of the vapor compression system; and
adjusting a position of an expansion device of the vapor compression system using a first control module or a second control module, wherein the first control module is configured to adjust the expansion device based on the measured amount of superheat of the refrigerant entering the compressor to achieve a target amount of superheat, and the second control module is configured to adjust the expansion device based on the discharge temperature of the refrigerant leaving the compressor to achieve a target discharge temperature;
switching from using the first control module to using the second control module in response to determining that the discharge temperature of the refrigerant leaving the compressor exceeds a first discharge temperature threshold for a predetermined amount of time; and
switching from using the first control module to using the second control module in response to determining that the discharge temperature of the refrigerant leaving the compressor exceeds a second discharge temperature threshold, wherein the second discharge temperature threshold is greater than the first discharge temperature threshold.

11. The method of claim 10, comprising switching from using the second control module to using the first control module in response to determining that the measured amount of superheat of the refrigerant entering the compressor exceeds a first superheat threshold for the predetermined amount of time or in response to determining that the measured amount of superheat of the refrigerant entering the compressor exceeds a second superheat threshold, wherein the second superheat threshold is greater than the first superheat threshold.

* * * * *